United States Patent [19]

Gustin

[11] Patent Number: 5,545,103

[45] Date of Patent: Aug. 13, 1996

[54] VEHICLE TRANSFER CASE WITH DUAL ELECTRICALLY-ACTUATED MAGNETIC CLUTCHES

[75] Inventor: David C. Gustin, Rockton, Ill.

[73] Assignee: Dana Corporation, Toledo, Ohio

[21] Appl. No.: 283,410

[22] Filed: Aug. 1, 1994

[51] Int. Cl.[6] .................... B60K 17/346; F16H 48/24
[52] U.S. Cl. .................. 475/223; 74/665 GA; 192/48.2; 192/84 C; 192/84 PM; 180/249
[58] Field of Search ..................... 180/248, 249; 74/665 GA; 192/35, 48.2, 48.8, 84 C, 84 PM; 475/222, 223

[56] References Cited

U.S. PATENT DOCUMENTS

| | | | |
|---|---|---|---|
| 2,279,986 | 4/1942 | Griswold | 192/48.2 |
| 2,605,877 | 8/1952 | Winther | 192/35 |
| 3,055,470 | 9/1962 | Pierce | 192/84 C |
| 4,747,464 | 5/1988 | Lanzer | 180/248 |
| 4,923,029 | 5/1990 | Lanzer | 180/248 |
| 5,234,072 | 8/1993 | Chludek | 180/248 |
| 5,275,253 | 1/1994 | Sperduti et al. | 180/248 X |

FOREIGN PATENT DOCUMENTS 1449736  1/1989  U.S.S.R. ............... 192/84 PM

*Primary Examiner*—Charles A. Marmor
*Assistant Examiner*—Nathan O. Jensen
*Attorney, Agent, or Firm*—Leydig, Voit & Mayer, Ltd.

[57] ABSTRACT

A vehicle drive train transfer case includes a differential with an input and two outputs, a normally disengaged electromagnetic first clutch, and a normally engaged second clutch adapted to be electromagnetically disengaged. When the first and second clutches are disengaged and engaged, respectively, torque is transmitted via the differential to the rear axle of the vehicle without torque being transmitted to the front axles so as to propel the vehicle in a two-wheel drive mode. When both clutches are engaged, the differential is locked so as to cause torque to be transmitted to both the front and rear axles and effect propelling of the vehicle in a conventional four-wheel drive mode. When the first and second clutches are engaged and disengaged, respectively, the differential is unlocked to enable torque to be transmitted to both the front and rear axles in an all-wheel drive mode.

6 Claims, 4 Drawing Sheets

VEHICLE TRANSFER CASE WITH DUAL ELECTRICALLY-ACTUATED MAGNETIC CLUTCHES

BACKGROUND OF THE INVENTION

This invention relates to a transfer case for use in the drive train of a vehicle such as an automobile or truck.

Basically, such vehicles have three different types of drive trains. The most common is a two-wheel drive train in which either the two rear wheels or the two front wheels are driven in order to propel the vehicle. While this systems offers the best fuel economy, it has poor traction under rainy, snowy or muddy road conditions.

Another system is a four-wheel drive train in which one drive shaft from a transfer case acts through a rear axle differential to drive the rear wheels while a second drive shaft from the transfer case acts through a front axle differential to drive the front wheels. By disengaging a clutch, one set of wheels may be selectively removed from the drive so as to increase fuel economy.

A four-wheel drive train is particularly advantageous if the vehicle becomes stuck in mud or snow or if the vehicle is driven on slick roads since the front and rear axle differentials act independently of one another and thus one set of wheels may maintain full traction even if one wheel of the other set is slipping. A four-wheel drive system is disadvantageous, however, under normal dry road conditions since, in the four-wheel drive mode, the drive shafts to the two sets of wheels are in effect a single rigid shaft and cannot accommodate differences in speeds between the front wheels and the rear wheels. As a practical matter, the four-wheel mode should only be used under wet or slippery conditions where the road surface has a low coefficient of friction to enable slippage of the wheels to accommodate front and rear wheel speed differences.

A more recent system is referred to as an all-wheel drive system. In such a system, a center differential is located in the transfer case between the front and rear drive shafts and accommodates differences in speeds between the front wheels and the rear wheels. As a result, the system may be kept in an all-wheel drive mode all of the time to provide enhanced control over the vehicle. If the vehicle is operating on extremely slippery roads or becomes stuck, the center differential may be locked out by means of a clutch in order to convert the system to a four-wheel drive system and thereby minimize wheel slippage. Thus, an all-wheel drive system possesses several advantages but suffers from the standpoint of relatively poor fuel economy.

SUMMARY OF THE INVENTION

The general aim of the present invention is to provide a new and improved vehicle transfer case which enables the vehicle to be selectively switched between a fuel efficient two-wheel drive mode, a high performance all-wheel drive mode and a high traction four-wheel drive mode.

Another object of the invention is to provide a transfer case which may be power-shifted between its modes on the fly at any engine or vehicle speed and under all road conditions.

A more detailed object is to achieve the foregoing by providing a transfer case having two electrically actuated clutches which coact with the center differential to effect independent driving of only one output shaft of the transfer case, to effect non-synchronous driving of both output shafts, or to lock up the differential and effect synchronous driving of the two output shafts.

The invention also resides in the relatively low electrical power requirements and the comparatively compact construction of the clutches.

These and other objects and advantages of the invention will become more apparent from the following detailed description when taken in conjunction with the accompanying drawings.

Figure 1:
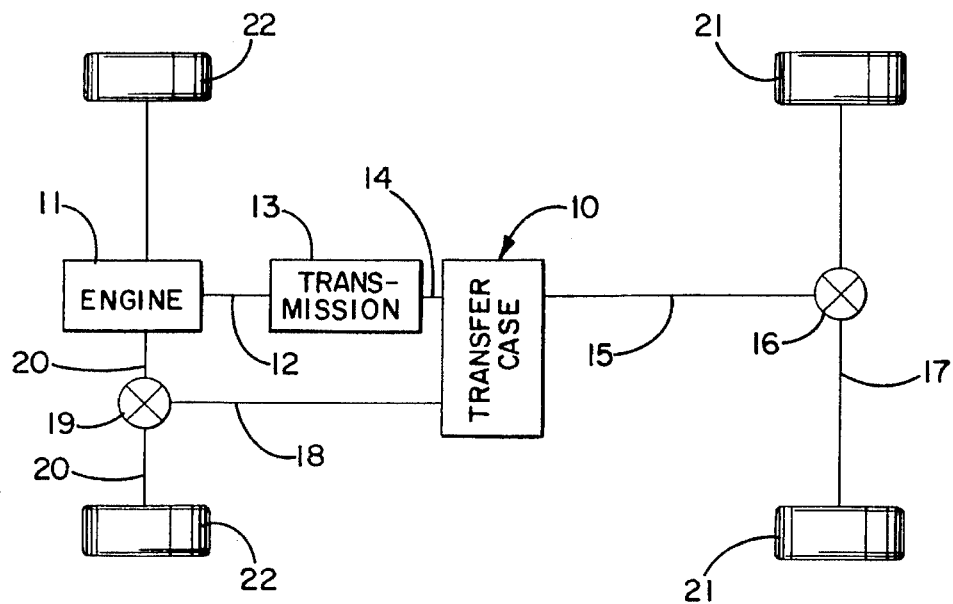
FIG. 1 is a schematic plan view of a vehicle drive train equipped with a new and improved transfer case incorporating the unique features of the present invention.
Figure 4:
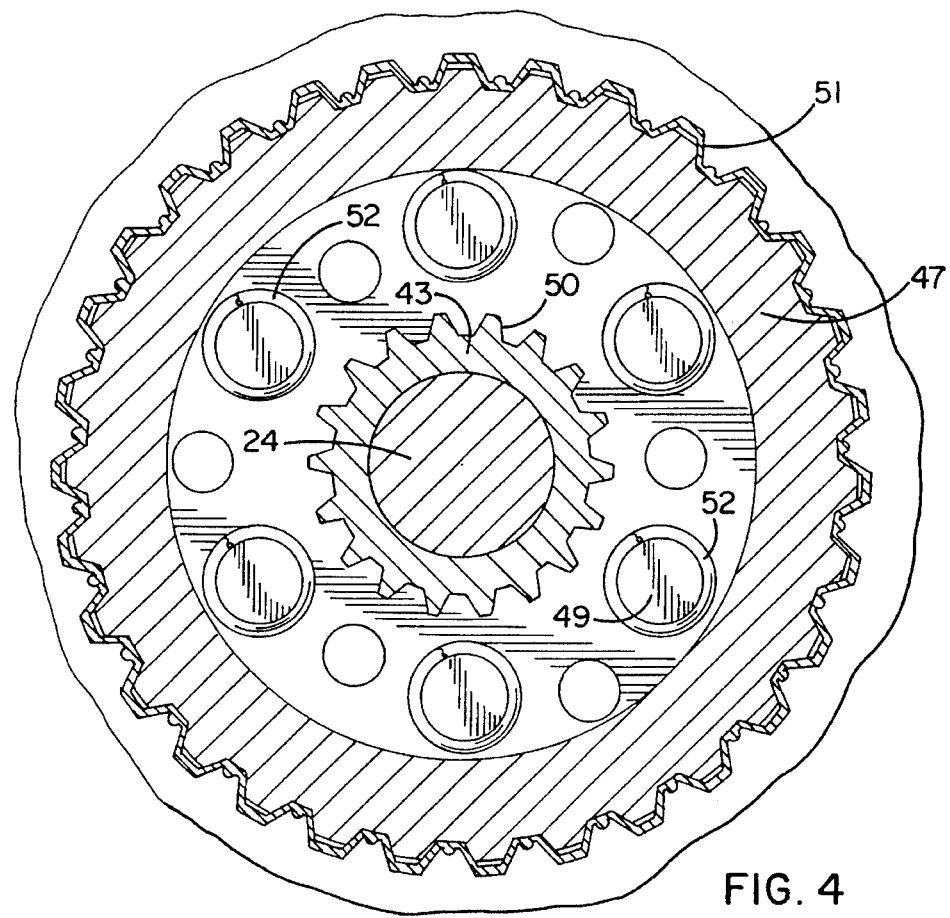
FIGS. 4 and 5 are fragmentary cross-sections, on a slightly reduced scale, and taken substantially along the lines 4—4 and 5—5, respectively, of FIG. 3.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the invention has been shown in the drawings as incorporated in a transfer case 10 for use in a vehicle power train. The power train includes an engine 11 having an output shaft 12 connected to a transmission 13 whose rotary output shaft 14 serves as an input to the transfer case. The latter is operable to rotate a rear drive shaft 15 connected to the differential 16 of rear drive axle 17 and also is operable to rotate a front drive shaft 18 connected to the differential 19 of front drive axles 20. The axles 17 and 20 act to drive rear wheels 21 and front wheels 22, respectively.

Figure 2:
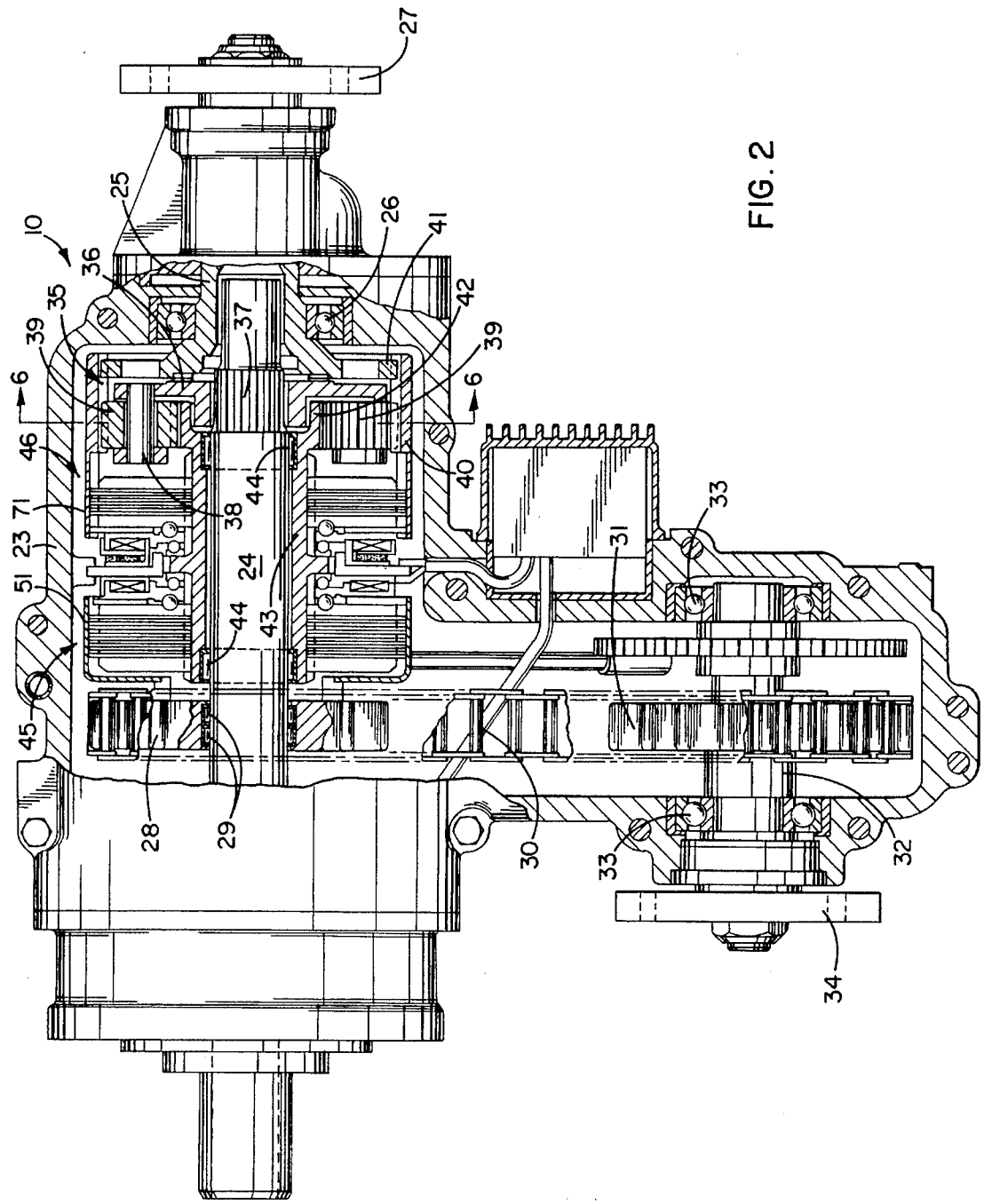
FIG. 2 is a top plan view of the transfer case with certain parts broken away and shown in section.

The transfer case 10 includes a housing 23 (FIG. 2) supporting a rotary input member or shaft 24 which is adapted to be rotated by the transmission output shaft 14. Another rotary member in the form of an output shaft 25 is journaled by a bearing 26 in the housing and is adapted to be rotated by the input shaft 24. In this instance, the output shaft 25 is connected to rotate the rear drive shaft 15 by means of a flange 27 on the shaft 25.

The transfer case 10 includes a second rotary output member which herein is in the form of a sprocket 28 journaled by a bearing 29 to rotate on the input shaft 24. A drive chain 30 is trained around the sprocket 28 and around a second sprocket 31 which is fixed to a shaft 32. The latter is journaled by bearings 33 in the housing 23 and acts to rotate the front drive shaft 18 by means of a flange 34 on the shaft 32.

Figure 6:
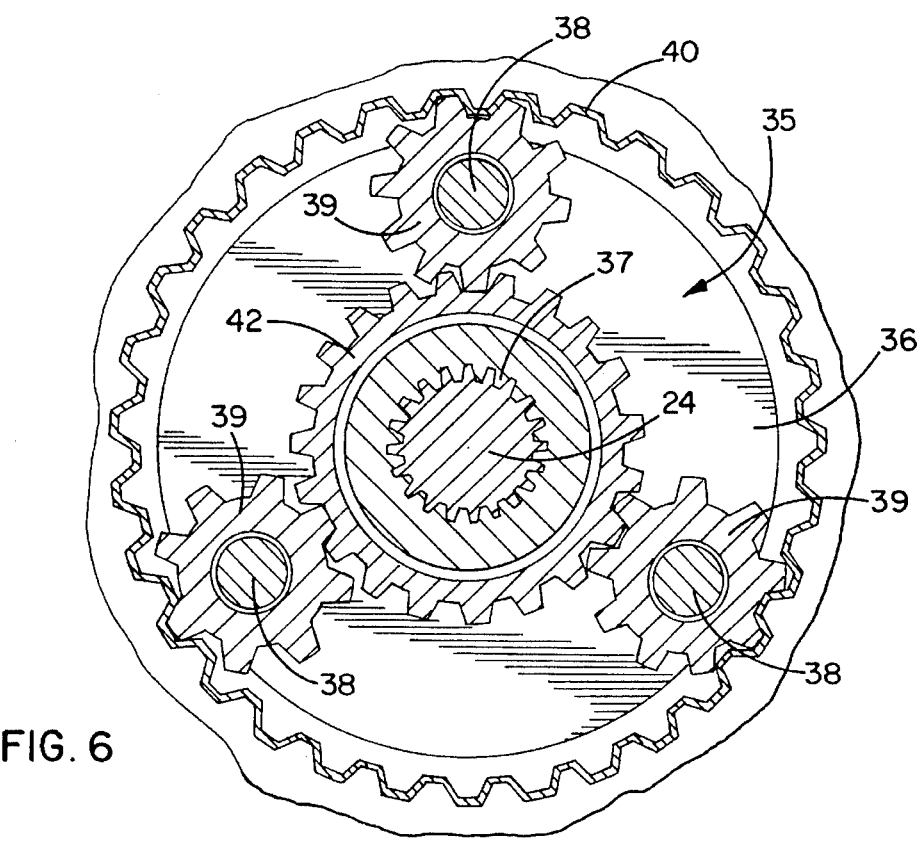
FIG. 6 is an enlarged fragmentary cross-section taken substantially along the line 6—6 of FIG. 2.

Thus, the rear wheels 21 are driven in response to rotation of the shaft 25 while the front wheels 22 are driven when the sprocket 28 is rotated. The input shaft 24 acts through a center differential 35 in order to rotate the output shaft 25. Herein, the differential comprises an input defined by a carrier 36 (FIGS. 2 and 6) which is splined to the input shaft 24 as indicated at 37. Rotatably supported on the carrier by pins 38 are angularly spaced planet gears 39, there herein being three such planet gears. The planet gears are encircled by and mesh with an internal ring gear 40 which defines one output of the differential 35 and which also meshes with teeth 41 on the output shaft 25 such that the output shaft 25 is rotated whenever the ring gear is rotated. The planet gears 39 also are spaced angularly around and mesh with a sun gear 42 which is rigid with one end of a sleeve 43 that is journaled on the input shaft 24 by bearings 44 (see FIG. 3). The sun gear and the connected sleeve constitute the second output of the differential.

In accordance with the present invention, the differential 35 of the transfer case 10 is controlled in such a manner as to enable the vehicle to be operated selectively in either a fuel efficient two-wheel drive mode, a high performance all-wheel drive mode or a high traction four-wheel drive mode. As will become apparent subsequently, the transfer case may be power shifted between any of the three modes at any vehicle or engine speed and under any road conditions.

More specifically, the foregoing is achieved by uniquely providing the transfer case 10 with two selectively engageable and disengageable clutches 45 and 46 (FIG. 3) which preferably are electrically controlled. The clutch 45 comprises a disc pack formed by a plurality of annular discs 47 sandwiched between an axially fixed plate 48 and an axially spaced and axially movable plate 49, the two plates encircling the sleeve 43 and being splined thereto as indicated at 50. Teeth on the inner periphery of every other disc 47 are splined to the sleeve 43 and thus those discs rotate with the sleeve, such discs and the plates 48 and 49 forming the input of the clutch 45. Teeth on the outer periphery of each intervening disc mesh with an internally splined cup 51 which encircles the discs so that the intervening discs and the cup rotate together. The cup also is coupled to rotate as a unit with the output sprocket 28.

Angularly spaced compression springs 52 (FIG. 3) located between the plates 48 and 49 urge the plate 49 away from the plate 48 and normally keep adjacent discs 47 out of frictional engagement with one another. Thus, torque normally is not transmitted from the sleeve 43 to the cup 51 and the sprocket 28. When the plate 49 is shifted axially toward the plate 48, the discs 47 are pressed into frictional engagement with each other and act to transmit torque from the sleeve 43 to the cup 51, the sprocket 28 and ultimately the front axles 20.

In order to shift the plate 49 toward the plate 48, the clutch 45 includes an electromagnetic actuator having a rotationally fixed field shell 54 (FIG. 3), an electrical coil 55 located within the field shell, a rotor 56 which rotates relative to the field shell, and an armature 57 which is located between the plate 49 and the rotor and whose outer periphery is splined to the cup 51. The rotor includes an inner ring 58 which is rotatable on the sleeve 43 and which is backed by a thrust bearing 59 seated against a circumferentially extending and radially outwardly projecting shoulder 60 of the sleeve.

Angularly spaced balls 61 are received in annular grooves 62 and 63 formed in adjacent faces of the plate 49 and the rotor ring 58, respectively, the balls being retained in a cage 64. The bottom of the groove 63 is ramped at angularly spaced locations such that, when the balls are shifted circumferentially in one direction relative to the plate 49, the balls cam the plate away from the ring 58 and press the discs 47 into tight frictional engagement so as to engage the clutch 45 and cause torque to be transmitted from the sleeve 43 to the cup 51.

Normally, the coil 55 is deenergized and the clutch 45 is disengaged. Under these conditions, the armature 57 is free of clutching engagement with the rotor 56. The plate 49 acts through the balls 61 to rotate the rotor and, when the clutch is disengaged, the balls are located in the grooves 62 and 63 in such positions as to enable the springs 52 to press the plate 49 toward the ring 58 and prevent the plate from effecting frictional engagement of the discs 47.

Figure 3:
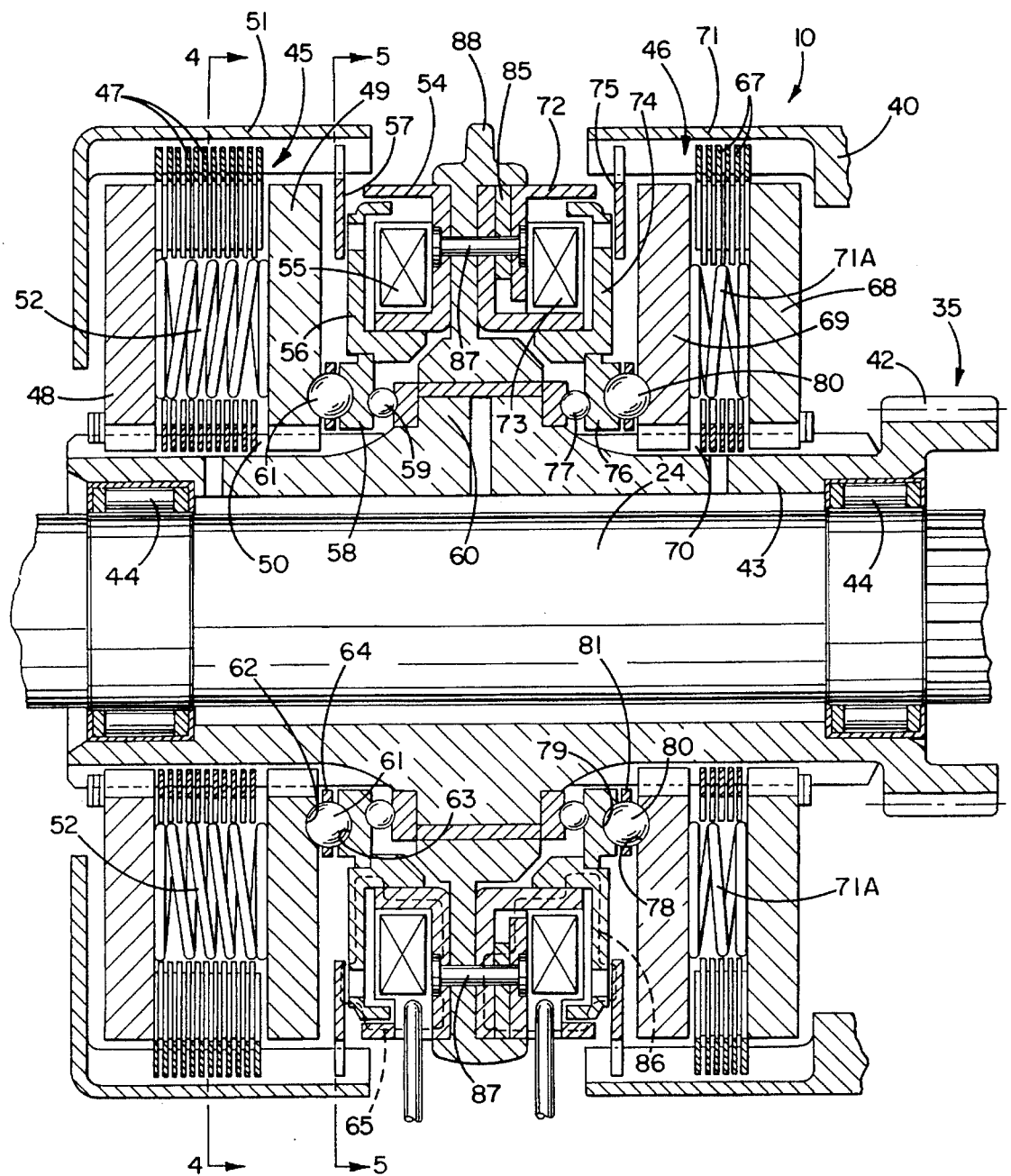
FIG. 3 is an enlarged view of certain components shown in FIG. 2.
Figure 5:
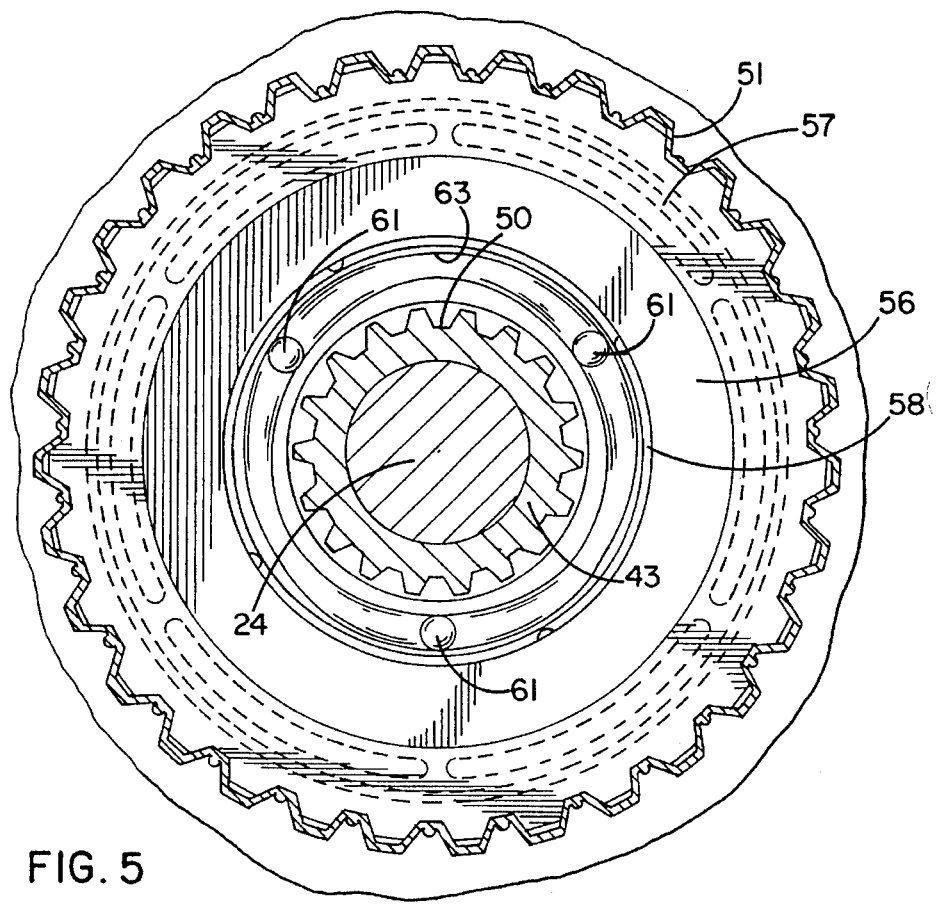

When the coil 55 is energized, magnetic flux threads a path indicated by the dotted line 65 in FIG. 3 and attracts the armature 57 into frictional engagement with the rotor 56. As a result of the rotor being subjected to the load of the cup 51, rotation of the rotor relative to the plate 49 is retarded to produce angular shifting of the rotor relative to the plate. Such shifting causes the balls 61 to act against the ramps of the groove 63 to force the plate 49 away from the rotor ring 58 and effect engagement of the clutch 45 by virtue of pressing the discs 47 into frictional engagement with one another. When the coil 55 is deenergized, the armature moves out of the clutching engagement with the rotor. The rotor, being relieved of the load, shifts angularly relative to the plate 49 so as to locate the balls 61 in position to enable the springs 52 to force the plate out of pressing engagement with the discs 47.

The clutch 46 is generally similar to the clutch 45 but normally is maintained in an engaged state. Thus, the clutch 46 comprises a disc pack formed by a plurality of annular discs 67 (FIG. 3) sandwiched between an axially fixed plate 68 and an axially spaced and axially movable plate 69. The two plates encircle the sleeve 43 and are splined to the sleeve at 70. Teeth on the inner periphery of every other disc 67 are splined to the sleeve while teeth on the outer periphery of each intervening disc mesh with a sleeve-like splined extension 71 of the ring gear 40. Accordingly, certain discs 67 rotate as a unit with the sleeve 43 while alternate discs rotate as a unit with the ring gear 40. The plates 68 and 69 and those discs 67 that are splined to the sleeve 43 define the input of the clutch 46. The plate 69 is urged away from the plate 68 by angularly spaced springs 71A which tend to keep the discs 67 out of frictional engagement with one another to prevent torque from being transmitted between the sleeve 43 and the ring gear 40.

The clutch 46 also includes an electromagnetic actuator having a rotationally fixed field member 72 (FIG. 3), an electrical coil 73 located within the field shell, a rotor 74 which rotates relative to the field shell and an armature 75 which is located between the plate 69 and the rotor 74 and whose outer periphery is splined to the extension 71 of the ring gear 40. Like the rotor 56, the rotor 74 includes an inner ring 76 rotatable on the sleeve 43 and backed by a thrust bearing 77 which seats against the shoulder 60.

Adjacent faces of the plate 69 and the rotor ring 76 are formed with annular grooves 78 and 79, respectively, which receive balls 80 retained in a cage 81, the bottom of the groove 79 being ramped in a manner similar to the bottom of the groove 63. When the balls 80 are shifted circumferentially in one direction relative to the plate 69, they cam the plate away from the ring 76 so as to cause the plate to press the discs 67 into tight frictional engagement thereby engaging the clutch 46 and causing torque to be transmitted between the sleeve 43 and the ring gear extension 71.

The clutch 46 differs from the clutch 45 in that the clutch 46 is engaged when the coil 73 is in a deenergized state. For this purpose, the field shell 72 of the clutch 46 includes a permanently magnetized ring 85 (FIG. 3). The permanent magnet normally attracts the armature 75 into frictional engagement with the rotor 74 and causes the rotor to be subjected to the load of the ring gear 40. As a result, rotation of the rotor relative to the plate 69 is retarded so as to cause the balls 80 to act against the ramps of the groove 79 and force the plate 69 away from the ring 76 and into pressing engagement with the discs 67.

When the coil 73 of the clutch 46 is energized, flux resulting therefrom threads a path indicated by the dotted line 86 in FIG. 3 and overcomes the permanent magnet flux in such a manner as to release the armature 75 from frictional engagement with the rotor 74. Being relieved from the load of the ring gear 40, the rotor shifts angularly relative to the plate 69 and causes the balls 80 to shift to positions permitting the springs 71A to move the plate out of pressing engagement with the discs 67 so as to disengage the clutch 46.

In passing, it should be noted that the field shells 54 and 72 of the clutches 45 and 46 are disposed back-to-back with one another and are secured by angularly spaced fasteners 87 (FIG. 3) to a mounting bracket 88 fixed within the housing 23. The back-to-back arrangement of the field shells enables the two clutches to be packaged in the housing in a very compact manner and facilitates connection of the coils 55 and 73 to the d.c. power source of the vehicle.

To explain the operation of the transfer case 10, assume that the driver of the vehicle wishes to operate the vehicle in a fuel efficient two-wheel drive mode. This is effected by placing the coils 55 and 73 of both clutches 45 and 46 in deenergized states. As a result, the clutch 45 is disengaged and is incapable of transmitting torque from the sleeve 43 to the cup 51 and the front axles 20. The permanent magnet 85 of the clutch 46, however, causes that clutch to be engaged so that the discs 67 prevent the ring gear 40 from rotating relative to the sleeve 43 and relative to the sun gear 42 carried thereby. With the ring gear 40 and the sun gear 42 of the differential 35 being locked against relative rotation, driving of the carrier 36 of the differential by the input shaft 24 causes the planet gears 39 to rotate the ring gear as a unit with the sun gear and the sleeve. The ring gear acts through the output shaft 25 to drive the rear axle 17 and propel the vehicle with only its rear wheels 21.

If the driver wishes to switch to all-wheel drive, the coils 55 and 73 of the clutches 45 and 46 are both energized, with vehicle voltage (e.g., twelve volts) applied to each coil. With both coils energized, the clutch 45 is engaged and the clutch 46 is disengaged. As a result of engagement of the clutch 45, the discs 47 couple the sun gear 42 and the sleeve 43 to the cup 51 so that driving of the sprocket 28 and the front axles 20 may be effected. Disengagement of the clutch 46 unlocks the ring gear 40 from the sun gear 42 and the sleeve 43. During driving of the carrier 36 by the input shaft 24, the planet gears 39 act through the ring gear 40 and the output shaft 25 to drive the rear axles 17 and, at the same time, act through the sun gear 42, the sleeve 43 and the clutch 45 to drive the front axles 20. In the specific transfer case 10 which has been disclosed, approximately 70 percent of the available torque is transmitted to the rear axles and approximately 30 percent to the front axles. The steady state current draw for each clutch in the all-wheel drive mode is approximately 1.5 amperes or a relatively low total draw of about 3 amperes.

When the transfer case 10 is in the all-wheel drive mode, the center differential 35 accommodates speed variations between the rear wheels 21 and the front wheels 22 and allows all four wheels to be driven without torque fluctuations being transmitted from the drive shaft 15 to the drive shaft 18 or vice versa and without excessive torsional loading of the transfer case 10 even though the road surface is dry and has a high coefficient of friction. In other words, the differential 35 eliminates the need for wheel slippage to avoid high torsional loading of the drive shafts and the transfer case. When the transfer case is in its two-wheel drive mode, the plates 48 and 49 and the rotor 56 of the clutch 45 impose a load on the sleeve 43 and on the sun gear 42 of the differential 35 to enable all of the torque to be transmitted via the planet gears 39 and the ring gear 40.

To switch the transfer case 10 to a four-wheel drive mode, the clutch 45 is engaged and the clutch 46 is usually fully engaged by completely deenergizing the coil 73. With the clutch 46 fully engaged, the center differential 35 is locked, the same as in the two-wheel drive mode, but the clutch 45 enables the sleeve 43 to transmit torque to the front axles 20. The available torque is split evenly between the front and rear axles and thus a high traction drive is established to propel the vehicle under extremely slippery conditions. In such an instance where the center differential 35 is locked, there is, in effect, a rigid connection between the drive shafts 15 and 18 and thus slick pavement conditions and resulting wheel slippage must be relied upon to prevent undesirable loading of the shafts and the transfer case 10.

It is possible to modulate the voltage to the clutch 46 from zero volts to 12 volts with the voltage being controlled, for example, by a microprocessor in correlation with signals from an antilock braking system. If the voltage to the clutch 46 is at an intermediate value, that clutch is partially engaged and partially slips, the differential 35 is partially locked and only a certain percentage of the available torque is split evenly between the rear and front axles 17 and 20 with the remainder of the torque being absorbed in slippage of the clutch 46.

From the foregoing, it will be apparent that the present invention brings to the art a new and improved transfer case 10 in which the clutches 45 and 46 coact with one another and with the center differential 35 to enable the vehicle to be driven selectively in a two-wheel mode, an all-wheel mode or a four-wheel mode. The clutches require relatively low power and enable power shifting between the various modes with no torque interrupt, at any engine or vehicle speed and in conjunction with a vehicle which is or is not equipped with front axle disconnect.

I claim:

1. A transfer case for a vehicle having front and rear axles, said transfer case having a rotary input member and having first and second rotary output members, said first output member being connected to rotate one of said axles, said second output member being connected to rotate the other of said axles, a differential having an input connected to be rotated by said input member, having a first output for rotating said first output member and having a second output for rotating said second output member, and first and second selectively operable clutch means for:

(a) causing the outputs of said differential to rotate as a unit and causing the input of said differential to transmit torque to said first output member without transmitting torque to said second output member when said first clutch means is fully disengaged and said second clutch means is fully engaged whereby torque is transmitted only to said first output member to drive only said one axle; and (b) allowing the outputs of said differential to rotate independently of one another and causing the input of said differential to transmit torque from said input member to both outputs of said differential and to both of said output members when said first clutch is fully engaged and said second clutch is fully disengaged, thereby to drive both of said axles;

said first and second clutch means comprising first and second field shells, respectively, disposed in back-to-back relation, each of said field shells having a selectively energizable electric coil, the coil of said first field shell being operable when energized to effect engagement of said first clutch means, said second field shell including a permanent magnet which normally effects engagement of said second clutch means, the coil of said second field shell being operable when energized to negate said permanent magnet and effect disengagement of said second clutch means.

2. A transfer case as defined in claim 1 in which said clutch means causes the outputs of said differential to rotate as a unit and causes said differential to transfer torque from said input member to both outputs of said differential and to both of said output members when both of clutch means are fully engaged.

3. A transfer case as defined in claim 1 in which said first clutch means comprises a clutch selectively operable to connect said second output of said differential to or disconnect said second output of said differential from said second output member.

4. A transfer case as defined in claim 1 in which said second clutch means comprises a clutch selectively operable to cause the outputs of said differential to rotate as a unit or to allow the outputs of said differential to rotate independently of one another.

5. A transfer case as defined in claim 4 in which said first clutch means comprises a clutch selectively operable to connect said second output of said differential to or disconnect said second output of said differential from said second output member.

6. A transfer case for a vehicle having rear and front axles, said transfer case having a rotary input member and having rear and front rotary output members connected to rotate said rear and front axles, respectively, a differential having an input connected to be rotated by said input member and having first and second outputs, the first output of said differential being connected to rotate said rear output member, first and second selectively engageable clutches comprising first and second field shells respectively, disposed in back-to-back relation, each of said field shells having a selectively energizable electric coil, the coil of said first field shell being operable when energized to effect engagement of said first clutch, said second field shell including a permanent magnet which normally effects engagement of said second clutch, the coil of said second field shell being operable when energized to negate said permanent magnet and effect disengagement of said second clutch, each of said clutches having an input connected to be rotated by the second output of said differential, said first and second clutches having outputs connected to said front rotary output member and to the first output of said differential, respectively, said clutches being operable when said first clutch is fully disengaged and said second clutch is fully engaged to cause the outputs of said differential to rotate as a unit and to cause the input of said differential to transmit torque to the first output of said differential and to said rear output member without transmitting torque to said front output member whereby torque is transmitted only to said rear output member to drive only said rear axle, said clutches being operable when said first clutch is fully engaged and said second clutch is fully disengaged to allow the outputs of said differential to rotate independently of one another and to cause the input of said differential to transfer torque to both outputs of said differential and to both of said output members thereby to drive both of said axles with said differential accommodating torque differences imposed on said output members, and said clutches being operable when both clutches are fully engaged to cause the outputs of said differential to rotate as a unit and cause said differential to transfer torque from said input member of both outputs of said differential and to both of said output members without accommodating torque differences imposed on said output members.

* * * * *